July 4, 1933. H. WATSON 1,916,452
SEALING DEVICE
Original Filed March 26, 1931  2 Sheets-Sheet 1

H. Watson
INVENTOR

Patented July 4, 1933

1,916,452

UNITED STATES PATENT OFFICE

HENRY WATSON, OF HIGHWALLS, DINAS POWYS, WALES

SEALING DEVICE

Original application filed March 26, 1931, Serial No. 525,543, and in Great Britain November 10, 1930. Divided and this application filed December 28, 1932. Serial No. 649,229.

This invention relates to piston rings for use in steam or internal combustion engines, vacuum pumps, hydraulic pumps and the like and particularly to piston rings and metallic packings of the kind in which the thickness of the material forming the ring is considerably in excess of the thickness of the material used in the usual spring rings employed, for instance, in connection with automobile engines.

In the specification of my co-pending application No. 525,543, from which the subject of the present application has been divided, I have described and claimed a construction of the above kind in which a bridge piece extends across a split in the ring, the bridge piece being permanently engaged with the material of the ring on one side of the split, and releasably locked with the material of the ring on the other side of the split.

The invention consists in a packing ring for pistons comprising an outer cylindrical member formed with a split, an inwardly projecting flange on the said member, an inner cylindrical member also formed with a split and engaging within the outer cylindrical member, the splits in each of the cylindrical members being arranged on opposite sides of the axis of the ring, means adapted to be actuated to cause relative movement between the two ends of the ring forming the sides of the split in the inner cylindrical member and thus by altering the dimensions of the inner cylindrical member to cause corresponding alterations in the dimensions of the outer cylindrical member, and means adapted releasably to lock the flange on the outer cylindrical member with an adjacent part of the inner cylindrical member.

The flange of each ring thus acts as it were as a bridge piece to span the split in the adjacent ring, and at the same time maintains both rings in their respective adjusted positions.

The inwardly projecting flange on the outer cylindrical member may be provided at a point therein remote from and normally opposite to that at which the split is located with slots, while on the adjacent face of the inner cylindrical member there are provided screw-threaded holes adapted to engage screws passing freely through the slots, the flange in the outer cylindrical member being normally provided with recesses adapted to house the heads of the screws.

Further, in the inwardly directed flange of the outer cylindrical member there may be provided adjacent to the split therein a recess extending across the split in which a secondary bridge piece is adapted to be engaged by means of a screw passing freely through a hole in the bridge piece and through the material of the flange into a screw-threaded hole provided in the adjacent surface of the body of the inner member, the said bridge piece also functioning as a tongue piece to prevent the working fluid leaking past the split.

For increasing the effective diameter of the ring any suitable adjusting means may be provided, for instance an element in the form of or functioning as a wedge or cam.

The invention will be described further in detail by way of example with reference to the accompanying drawings, in which:—

Figure 1:
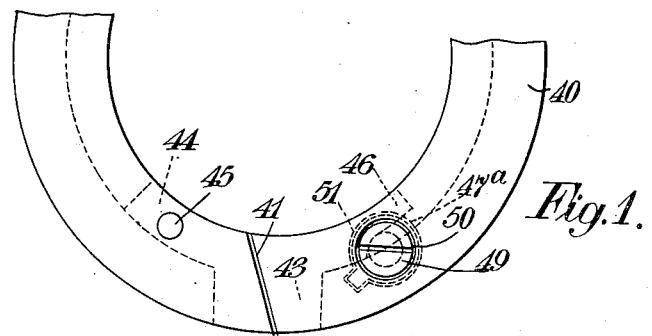
Figure 1 is a view in elevation of one face of one construction in accordance with the invention.
Figure 2:
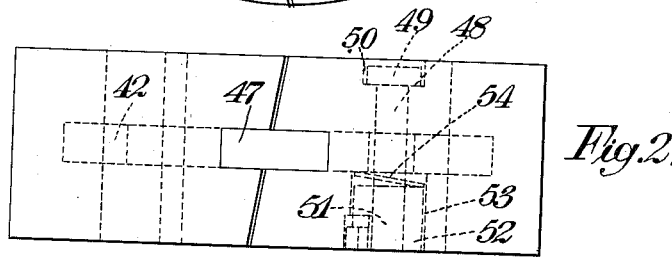
Figure 2 is a side view of the construction illustrated in Figure 1.

In the construction illustrated in Figures 1 and 2 the ring 40 is provided with a split 41 and a recessed portion 42 extending through to the outer periphery of the ring within which is engaged the bridge piece 43 provided with a portion 44 extending into the recess at one side of the split and secured thereto by means of the pin 45, the portion 46 engaging within that portion of the recess formed in the ring on the opposite side of the split, and the portion 47 extending through to the outer periphery of the ring and adapted to prevent leakage of working fluid through the split.

The portion 46 is provided with a recessed part 47a adapted to bear against the screw 48 which is provided with a slotted head 49 housed within the recess 50 formed in the ring and a screw-threaded portion 51 engaging with the internally screw-threaded sleeve 52 precluded from rotation but slidable within the hole 53, and between the sleeve 52 and the portion 46 of the bridge member there is located the spring washer 54.

With this construction the width of the split is adapted to be adjusted by means of a suitable tool inserted therein after which the screw 48 is tightened up and the pressure of the sleeve 52 bearing against the spring washer 54 locks the bridge member in position thereby retaining the split at its desired adjustment.

Figure 3:
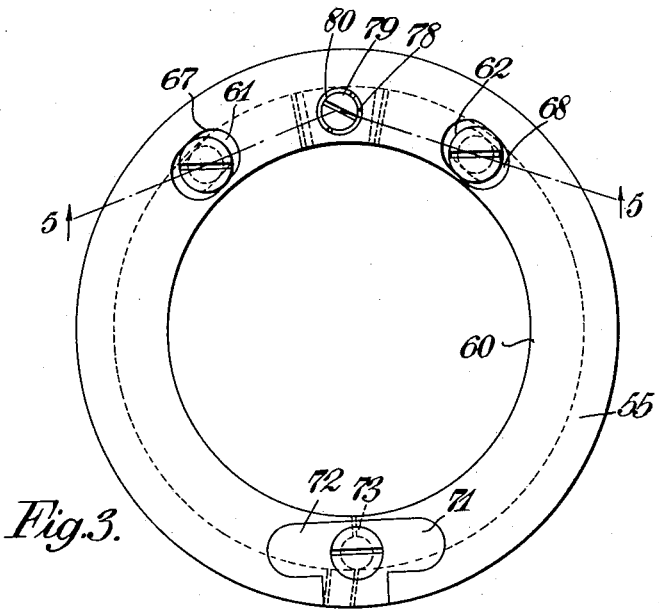
Figure 3 is a view in elevation of one face of a second construction.
Figure 5:
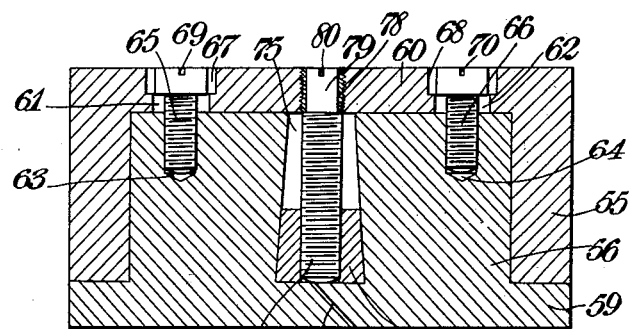
Figure 5 is a view in section taken along the lines V—V of Figure 3.
Figure 4:
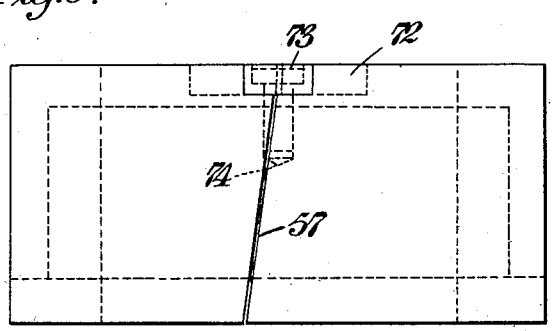
Figure 4 is a side view of the construction illustrated in Figure 3.

In the construction illustrated in Figures 3, 4 and 5 the ring comprises an outer cylindrical member 55 and an inner cylindrical member 56 provided respectively with splits 57, 58, and the cylindrical members are arranged one within the other in such manner that the splits are out of register and are located on opposite sides of the axis of the ring, the inner ring being provided with an outwardly projecting flange 59 while the outer ring is provided with an inwardly projecting flange 60, the respective external and internal diameters of the flanges being substantially the same as the outer diameter of the body of the outer cylindrical member and the inner diameter of the body of the inner cylindrical member.

For the purpose of locking or securing the two cylindrical members in their adjusted positions or states after expanding or contracting the cylindrical members for the purpose of adjusting the effective diameter of the ring, the inwardly projecting flange 60 is provided with slots 61, 62 and on the adjacent face of the inner cylindrical member there are provided corresponding screw-threaded holes 63, 64 adapted to engage screws 65, 66 passing freely through the slots, the flange 60 being provided with recesses 67, 68 adapted to house the heads 69, 70 of the screws.

The flange 60 is also provided adjacent to the split 57 with a recess 71 extending across the split in which the bridge piece 72 extending to the outer periphery of the ring is adapted to be engaged by means of the screw 73 passing freely through a hole in the bridge piece and through the material of the flange 60 into a screw-threaded hole 74 provided in the adjacent surface of the body of the inner cylindrical member, the function of the bridge piece 72 being as in the case of previously described constructions to prevent leakage of the working fluid past the split in the ring.

The means for expanding the inner cylindrical member and consequently also for securing the expansion of the outer cylindrical member are in this construction wholly incorporated in the body of the ring.

Thus, in the body portion of the inner cylindrical member the split 58 is widened out to form a gap 75 of a width diminishing from one face or end of the cylindrical member towards the opposite face thereof and in this gap there is engaged a wedge member 76 provided with a screw-threaded hole with which is engaged the screw-threaded rod 77 one end of which is adapted to abut against a portion of the inner cylindrical member located at one end of the gap therein, the other end of the rod being arranged to cooperate with an abutment 78 in the form of an externally screw-threaded steel sleeve arranged in removable connection with the flange of the outer cylindrical member, the internal diameter of which corresponds with the reduced external diameter of the end 79 of the screw-threaded rod, the end 79 being provided with a slot 80 permitting its engagement and rotation by a screw driver.

With this construction in order to increase the effective diameter of the ring the screws 61, 62 will be released and by means of a screw driver the rod associated with the wedge will be rotated in order to move the wedge appropriately in the gap thereby effecting expansion or contraction of the inner cylindrical member with the resultant expansion or contraction of the outer cylindrical member.

As will be understood the screws 65, 66 passing through the slots in the inwardly projecting flange of the outer cylindrical member will when released permit movement of the two cylindrical members, and when the diameter of the ring increases to the desired degree these screws will be tightened up thereby locking the inwardly directed flange of the outer cylindrical member to the body of the inner cylindrical member.

A similar tightening of the screw 73 associated with the bridge piece 72 will also operate to lock the outer cylindrical member to the split in its adjusted position.

Figure 6:
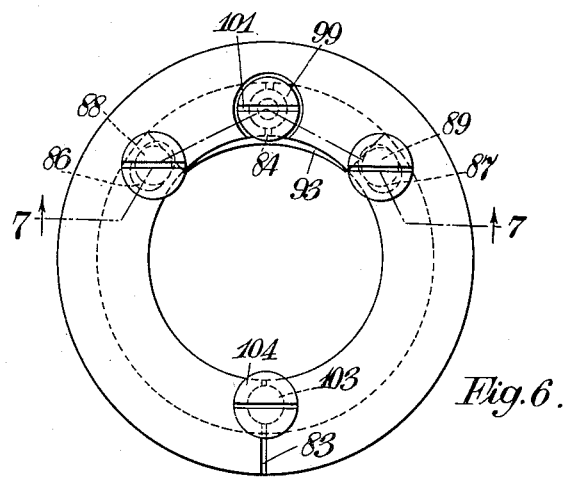
Figure 6 is a view in elevation of one face of a third construction.
Figure 7:
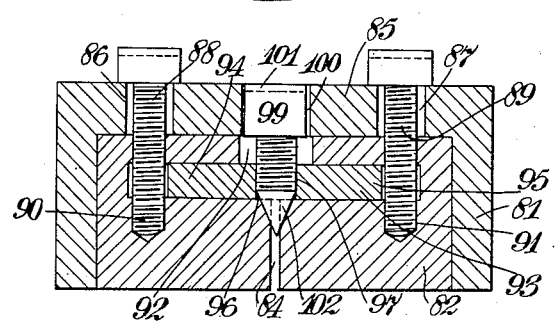
Figure 7 is a distorted view of the section taken along the lines VII—VII of Figure 6.

In the construction illustrated in Figures 6 and 7 the ring comprises an outer cylindrical member 81 and an inner cylindrical member 82 provided respectively with splits 83, 84 which, as in the case of the construction previously described, are out of register and are located on opposite sides of the axis of the ring, the inner cylindrical member in this construction being in the form of a plain annulus engaging within the outer cylindrical member and the latter being provided with an inwardly projecting flange 85, the external diameters of the inner cylindrical member being substantially the same as the inner diameter of the body of the outer cylindrical member.

For locking or securing the respective cylindrical members in their adjusted positions or states the flange 85 is provided with slots or states the flange 85 is provided with slots 86, 87 through which freely pass the stems of the screws 88, 89 engaging with the screw-threaded surface of the holes 90, 91 formed in the inner cylindrical member.

The inner cylindrical member is also provided adjacent to the split 84 with a recess 92 in which there is engaged the bridge piece 93 the ends 94, 95 of which extend to points adjacent to the stems of the screws 88, 89.

A screw-threaded hole 96 is provided within the bridge piece and engaging with the hole is the screw 97, the latter being provided with an enlarged head 99 housed within the hole 100 formed within the flange 85, and the head 99 is provided with a slot 101 adapted to be engaged by a screw driver or the like instrument, the end of the screw remote from the enlarged head being provided with a conical portion 102 adapted to engage between the sides of the split 84.

Adjacent to the split 83 the flange 85 is provided with a hole 103 through which freely passes the stem of the screw 104 adapted to engage with a screw-threaded hole formed within the adjacent surface of the inner cylindrical member 82.

In order to adjust the diameter of the ring the screws 88, 89, 104 are first slackened off and the screw 97 is rotated to the desired extent by means of a screw driver or other instrument inserted in the slot 101 until by expansion or contraction of the inner cylindrical member due to the action of the conical portion 102 on the sides of the split 84 and the consequent expansion or contraction of the outer cylindrical member the desired adjustment is secured.

The screws 88, 89, 104 are then tightened up in order to lock the two cylindrical members together in their adjusted positions.

Having now described my invention, what I claim as new and desire to secure by Letters Patent is:—

1. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, and means adapted releasably to lock the flange on the outer cylindrical member with an adjacent part of the inner cylindrical member.

2. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, and means adapted releasably to lock the flange on the outer cylindrical member with an adjacent part of the inner cylindrical member.

3. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, slots in the inwardly projecting flange of the outer cylindrical member, and locking screws passing freely through the said slots and engaging with the material of the inner cylindrical member, adapted releasably to lock the flange on the outer cylindrical member with the inner cylindrical member.

4. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, slots in the inwardly projecting flange of the outer cylindrical member, and locking screws passing freely through the said slots and engaging with the material of the inner cylindrical member, said locking screws being adapted releasably to lock the flange on the outer cylindrical member with the inner cylindrical member.

5. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, slots in the inwardly projecting flange of thte outer cylindrical member, further slots in the said flange adjacent to the first-mentioned slots, locking screws passing freely through the first-mentioned slots and engaging with the material of the inner cylindrical member, and adjusting heads on the locking screws housed within the second-mentioned slots, adapted to permit rotation of the said screws so as releasably to lock the flange on the outer cylindrical member with the material of the inner cylindrical member.

6. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, means adapted to be actuated to cause relative movement between the two ends of the inner cylindrical member forming the sides of the split therein and thus by altering the dimensions of the inner cylindrical member to cause corresponding alterations in the dimensions of the outer cylindrical member, slots in the inwardly projecting flange of the outer cylindrical member, further slots in the said flange adjacent to the first-mentioned slots, locking screws passing freely through the first-mentioned slots and engaging with the material of the inner cylindrical member, recesses in the flange on the outer cylindrical member adjacent to the split therein, a tongue piece formed with a hole and located within the recesses, and a screw passing freely through a hole in the tongue piece and releasably securing the said tongue piece in locking engagement with the material of the inner cylindrical member.

7. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, surfaces inclined with respect to one another formed on opposite sides of the split in the inner cylindrical member, a wedge engaging against the inclined surfaces, an adjusting screw engaging with the wedge and adapted to be rotated in one sense to move the wedge in one direction relatively to the inclined surfaces, thus forcing apart the ends of the inner cylindrical member forming the sides of the split therein and expanding the outer cylindrical member, and to be rotated in the opposite sense to cause the wedge to move in an opposite direction relative to the inclined surfaces, thereby bringing together the sides of the split in the inner cylindrical member and contracting the outer cylindrical member, and means adapted releasably to lock the flange on the outer cylindrical member with an adjacent part of the inner cylindrical member.

8. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, surfaces inclined with respect to one another formed on opposite sides of the split in the inner cylindrical member, a wedge engaging against the inclined surfaces, an adjusting screw engaging with the wedge and adapted to be rotated in one sense to move the wedge in one direction relatively to the inclined surfaces thus forcing apart the ends of the inner cylindrical member forming the sides of the split therein and expanding the outer cylindrical member, and to be rotated in an opposite sense to cause the wedge to move in the opposite direction relative to the inclined surfaces, thereby bringing together the sides of the split in the inner cylindrical member and contracting the outer cylindrical member, and means adapted releasably to lock the flange on the outer cylindrical member with an adjacent part of the inner cylindrical member.

9. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an outwardly projecting flange on the inner cylindrical member, surfaces inclined with respect to one another formed on opposite sides of the split in the inner cylindrical member, a wedge engaging against the inclined surfaces, an adjusting screw engaging with the wedge and adapted to be rotated in one sense to move the wedge in one direction relatively to the inclined surface thus forcing apart the ends of the inner cylindrical member forming the sides of the split therein and expanding the outer cylindrical member, and to be rotated in an opposite sense to cause the wedge to move in an opposite direction relative to the inclined surfaces, thereby bringing together the sides of the split in the inner cylindrical member and contracting the outer cylindrical member, slots in the inwardly projecting flange of the outer cylindrical member, and locking screws passing freely through the said slots and engaging with the material of the inner cylindrical member, the said locking screws being adapted to releasably lock the flange on the outer cylindrical member with the inner cylindrical member.

10. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, surfaces inclined with respect to one another formed on opposite sides of the split in the inner cylindrical member, a wedge engaging against said inclined surfaces, an adjusting screw engaging with the wedge and adapted to be rotated in one sense to move the wedge in one direction relatively to the inclined surfaces thus forcing apart the ends of the inner cylindrical member forming the sides of the split therein and expanding the outer cylindrical member, and to be rotated in an opposite sense to cause the wedge to move in an opposite direction relative to the inclined surfaces thereby bringing together the sides of the split in the inner cylindrical member and contracting the outer cylindrical member, slots in the inwardly projecting flange of the outer cylindrical member, and locking screws passing freely through the said slots and engaging with the material of the inner cylindrical member, said locking screws being adapted releasably to lock the flange on the outer cylindrical member with the inner cylindrical member.

11. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, an adjusting screw having a conical point engaging between the sides of the split in the inner cylindrical member, said adjusting screw being adapted to be rotated to cause relative movement between the two ends of the cylindrical member forming the sides of the said split and thus by altering the dimensions of the inner cylindrical member to cause corresponding alterations in the dimensions of the outer cylindrical member.

12. A packing ring for pistons comprising an outer cylindrical member formed with a split, an inwardly projecting flange on the said member, an inner cylindrical member also formed with a split and engaging within the outer cylindrical member, the splits in each of the cylindrical members being located on opposite sides of the axis of the ring, recesses formed in the material of the inner cylindrical member upon either side of the split therein, a bridge piece extending across the said split and engaging within the recesses, an adjusting screw passing through the said bridge piece and in screw-threaded engagement therewith, said adjusting screw being provided with a conical point engaging between the sides of the split in the inner cylindrical member, and being adapted to be rotated to cause relative movement between the sides of the split with which it is associated and thus by altering the dimensions of the inner cylindrical member to cause corresponding alterations in the dimensions of the outer cylindrical member, and locking screws passing through the flange on the outer cylindrical member and entering into engagement with the material of the inner cylindrical member so as releasably to lock the flange on the said outer cylindrical member with the material of the inner cylindrical member.

In testimony whereof I have signed my name to this specification.

HENRY WATSON.